United States Patent [19]

Jones

[11] Patent Number: 5,068,921
[45] Date of Patent: Dec. 3, 1991

[54] CANINE BULLET-PROOF VEST

[76] Inventor: Frank T. Jones, 1732 Biscayne Ave., South Daytona, Fla. 32019

[21] Appl. No.: 349,490

[22] Filed: May 9, 1989

[51] Int. Cl.⁵ ............................................. F41H 1/02
[52] U.S. Cl. ............................................ 2/2.5; 54/79
[58] Field of Search ...................... 2/2.5, 2, 44, 69, 92; 54/1, 24, 65, 66, 71, 79; 119/143; 128/157, 159

[56] References Cited

U.S. PATENT DOCUMENTS

| | | | |
|---|---|---|---|
| D. 228,926 | 10/1973 | Bennett | 54/79 |
| 1,437,255 | 11/1922 | Mallinson | 54/79 |
| 1,595,834 | 8/1926 | Griffiths | 54/79 |
| 1,772,827 | 8/1930 | Udell | 54/79 |
| 2,003,435 | 6/1935 | Groff | 54/79 |
| 2,103,109 | 12/1937 | DeMar | 54/79 |
| 2,273,706 | 2/1942 | Hafner | 54/79 |
| 2,400,781 | 5/1946 | Priour | 54/79 |
| 2,417,803 | 3/1947 | DeMar | 54/79 |
| 3,141,443 | 7/1964 | Huey | 54/79 |
| 3,150,641 | 9/1964 | Kesh | 54/79 |
| 3,813,281 | 5/1974 | Burgess | 2/2.5 |
| 3,855,632 | 12/1974 | Davis | 2/2.5 |
| 4,114,352 | 9/1978 | Horton | 119/143 |
| 4,186,648 | 2/1980 | Clausen | 2/2.5 |
| 4,198,707 | 4/1980 | Haupt | 2/2.5 |
| 4,316,286 | 2/1982 | Klein | 2/2.5 |
| 4,355,600 | 10/1982 | Zielinski | 128/159 |
| 4,485,491 | 12/1984 | Rasmussen | 2/2.5 |
| 4,507,802 | 4/1985 | Small | 2/2.5 |
| 4,535,478 | 8/1985 | Zufle | 2/2.5 |
| 4,578,821 | 4/1986 | Zufle | 2/2.5 |
| 4,601,067 | 7/1986 | Buonassissi | 2/2.5 |

FOREIGN PATENT DOCUMENTS

| | | | |
|---|---|---|---|
| 1029346 | 5/1966 | United Kingdom | 119/143 |
| 1579800 | 11/1980 | United Kingdom | 54/79 |

Primary Examiner—Werner H. Schroeder
Assistant Examiner—Diana L. Biefeld
Attorney, Agent, or Firm—H. Jay Spiegel

[57] ABSTRACT

The present invention relates to a bullet-proof vest designed for use on a dog. The vest includes an outer covering which wraps aroung the body of the dog to protect the vital organs thereof and includes internal pockets designed to removably receive bullet-proof material.

4 Claims, 2 Drawing Sheets

CANINE BULLET-PROOF VEST

BACKGROUND OF THE INVENTION

Clothing for animals is known and many dogs wear sweaters which are usually of tubular construction meant to be pulled over the head of the dog and having openings through which the legs may be extended. However, applicant is unaware of any clothing for dogs which includes the provision of bullet-resistant material.

Police departments throughout the country invest large sums of money in training dogs, caring for them, feeding and housing them. As is known, dogs are used for numerous diverse types of missions by police departments. They are used to detect the presence of narcotics in luggage, they are used to search for people based upon their senses of smell and hearing, they are used to go into buildings ahead of police to chase suspects.

Since dogs are very often the first member of the police department to arrive at the location of the suspect, they are usually placed in an extremely vulnerable position. Since police departments spend thousands of dollars for the expenses for each dog used, a need has developed to provide a means for protecting police dogs from harm when being shot at by suspects.

Further, a need has developed for a means of protection for dogs when they are placed in such precarious positions.

The following prior art is known to applicant:

1,437,255 to Mallinson
1,595,834 to Griffiths
2,273,706 to Hafner
3,141,443 to Huey
3,813,281 to Burgess
3,855,632 to Davis
4,186,648 to Clausen
4,198,707 to Haupt
4,355,600 to Zielinski Each of Mallinson, Griffiths, Hafner, Huey and Zielinski teaches the concept of an article of clothing for a dog. These articles of clothing are, generally speaking, of tubular construction including openings for the legs of the dog. None of these patents teaches the concept of armor incorporated in canine clothing.

Each of Burgess, et al., Davis, Clausen, et al. and Haupt, et al. teaches the concept of bullet-resistant armor with at least David and Haupt, et al. teaching such armor incorporated into human clothing.

While the above-listed United States Patents teach, on the one hand, clothing for a dog and, on the other hand, bullet-resistant clothing for a human, there is no teaching or suggestion in these references of the provision of bullet-resistant clothing for a dog. As such, a need has developed for such a product.

SUMMARY OF THE INVENTION

The present invention relates to a canine bullet-resistant vest. The present invention includes the following interrelated aspects and features:

(a) In a first aspect of the present invention, the inventive vest is draped over the dog and is fastened underneath the dog by suitable means such as straps and buckles, VELCRO, snaps or the like.

(b) On the inner surfaces of the vest, a plurality of pockets are formed so that bullet-resistant pads may be inserted and removed therefrom.

(c) Bullet-resistant pads are provided for the flanks and chest and to protect areas of vulnerability with regard to the vital organs of the dog.

As such, it is a first object of the present invention to provide an improved canine bullet-resistant vest.

It is a further object of the present invention to provide such a vest including removable bullet-resistant pads.

It is a yet further object of the present invention to provide such a vest which is placed on the dog by draping over the dog and fastening underneath.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
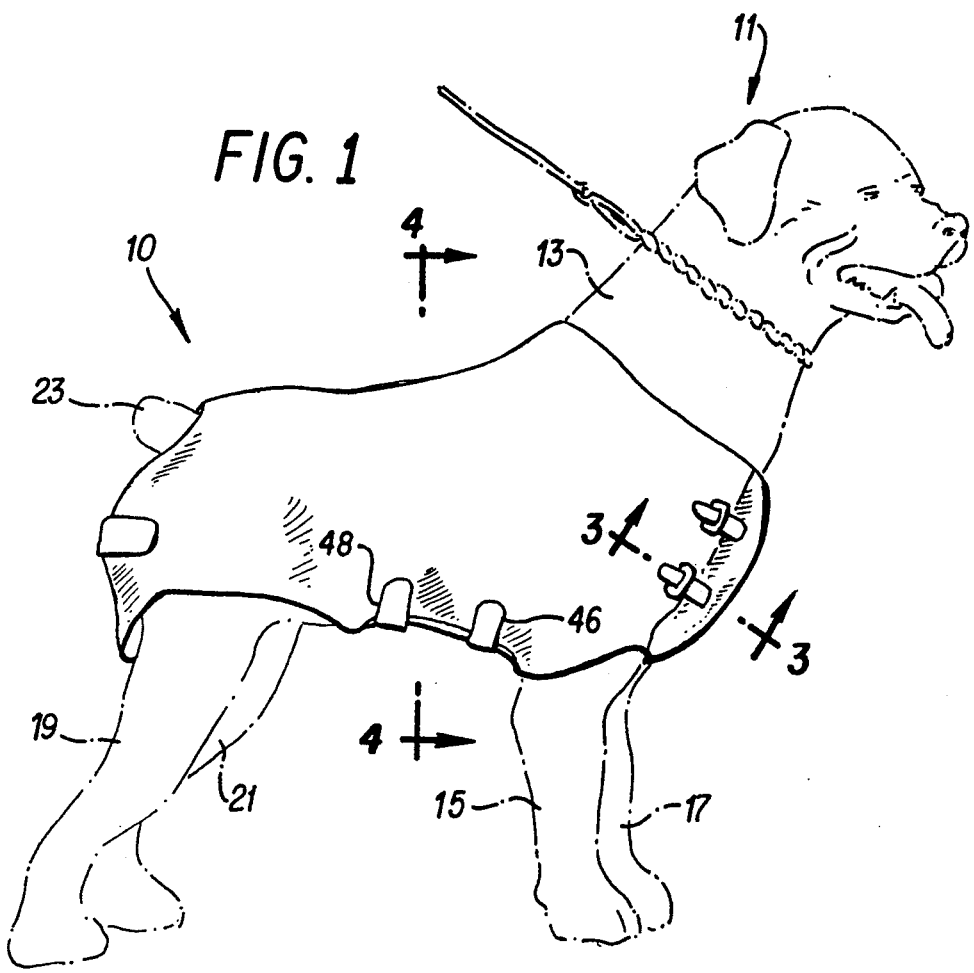
FIG. 1 shows a side view of the inventive vest as assembled on a dog.
Figure 2:
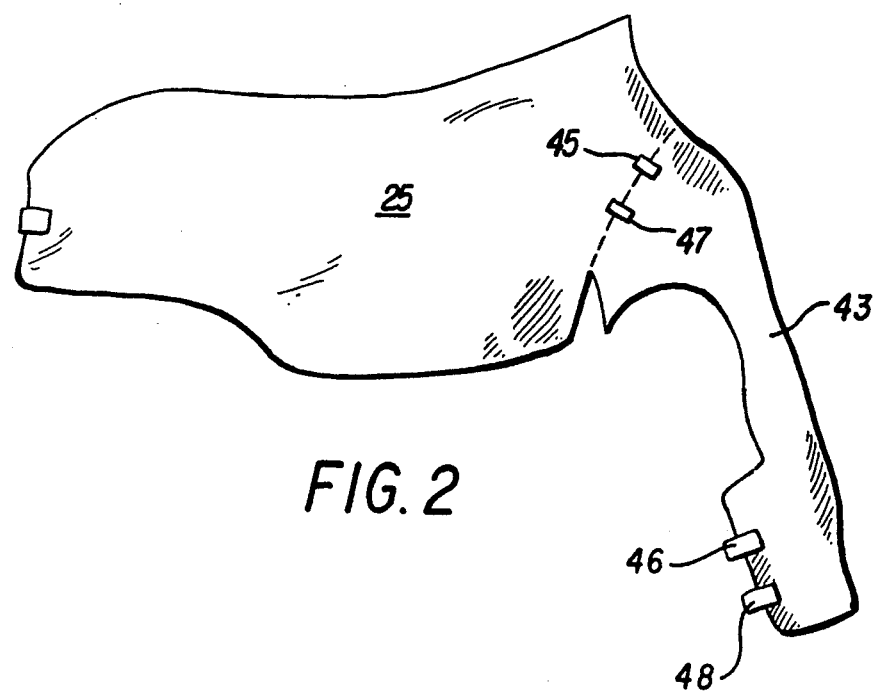
FIG. 2 shows a side view of the vest with the chest protecting portion thereof open.

With reference, firstly, to FIG. 1, the inventive bullet-resistant vest is generally designated by the reference numeral 10 and is seen to be assembled on the dog 11. The dog 11 has a neck 13, legs 15, 17, 19 and 21, and a tail 23.

Figure 5:
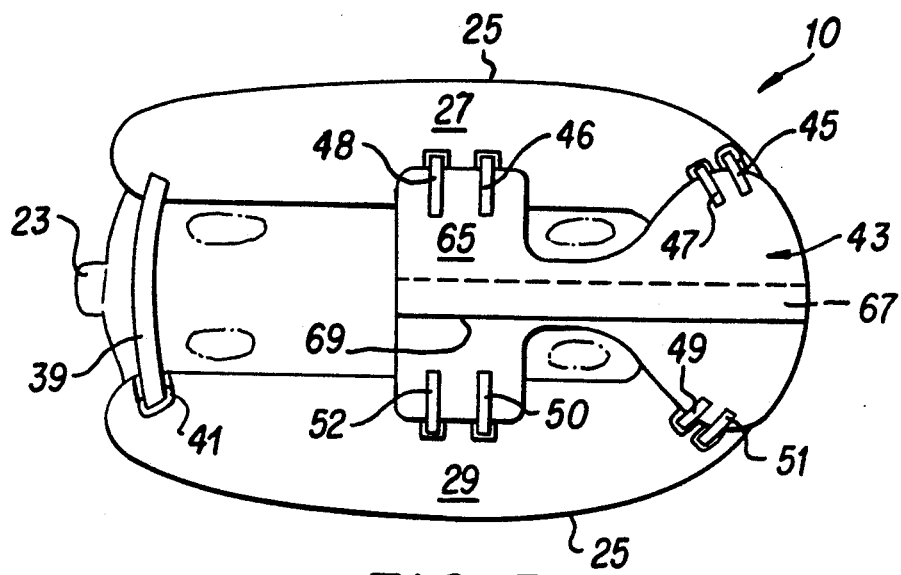
FIG. 5 shows a bottom view of the vest as assembled on a dog.

The vest 10 includes a body 25 which is draped over the back of the dog and, as best seen in FIG. 5, has spaced sides 27 and 29. With further reference to FIGS. 1 and 5, it is seen that a fastening means 39, 41 is provided to fasten the rear end of the vest between the tail 23 of the dog and the rear legs 19, 21 thereof.

After the vest has been draped over the dog and fastened through the use of the fastening means 39, 41 best seen in FIG. 5, a shoulder, chest and sternum protecting portion 43 may be attached to the vest through suitable means such as VELCRO, snaps or buckle fasteners to the orientation shown in FIG. 5. The fasteners are generally designated by the reference numerals 45, 46, 47, 48, 49, 50, 51 and 52.

Figure 4:
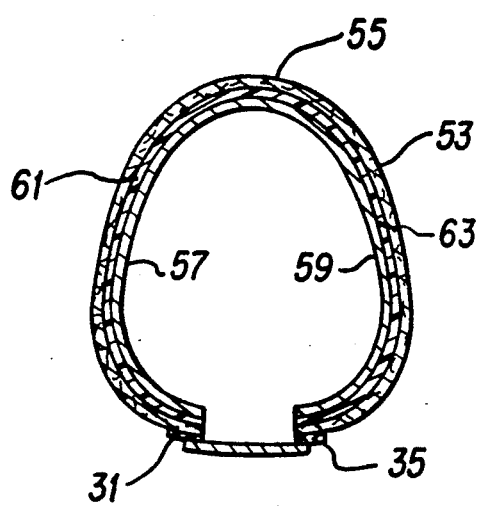
FIG. 4 shows a cross-sectional view along the line IV—IV of FIG. 1.

With reference to FIG. 4, it is seen that the main body 25 of the vest 10 has an outer surface 53 and an inner surface 55. Two side pockets 57 and 59 are provided on the inner surface 55 of the main body 25 of the vest 10, which pockets 57 and 59 may extend from front to back as far as necessary to protect those vital organs and areas on the dog's body as desired. Alternatively, each pocket 57 or 59 may, instead, comprise a plurality of smaller closely spaced pockets.

The pocket 57 has removably placed therein a bullet-resistant pad 61, while the pocket 59 has removably placed therein a bullet-resistant pad 63. Of course, if the pockets 57 and 59 are to be replaced with a plurality of smaller closely spaced pockets, respectively, in each case, a pad conforming to the size and configuration of each such pocket would be provided.

Figure 3:
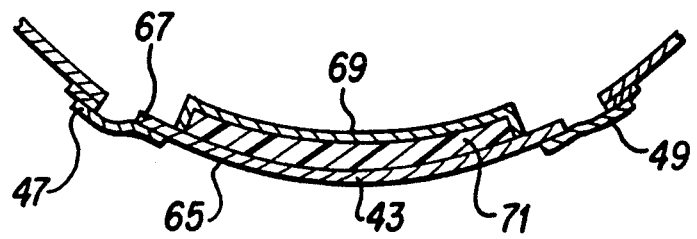
FIG. 3 shows a cross-sectional view along the line III—III of FIG. 1.

With reference to FIG. 3, the chest protection portion 43 is seen to include an outer surface 65 and an inner surface 67. On the outer surface is provided an opening 69 (FIG. 5) in which is removably placed a bullet-resistant pad 71.

Each of the bullet-resistant pads seen in FIGS. 3 and 4 and designated by the reference numerals 61, 63 and 71 may be made of any bullet-resistant material. However, a bullet-resistant material sold under the trademark KEVLAR is preferred because it is light weight and pliable and as such does not add a lot of weight to the vest. Such a pad may, if desired, be made of a plurality of thin layers of KEVLAR material. Again, any bullet-resistant material may be used for the pads, although the light weight nature of KEVLAR enhances its feasibility in this environment. The placement of the inventive vest 10 on the dog 11 and removal therefrom are self-explanatory, in light of the above description through the use of the various fasteners provided as illustrated in the drawing figures. The material for the body 25 and chest protection portion 43 may be any fabric such as cotton, wool, or synthetic fabrics such as nylon, rayon, and the like. Pliability ability to support bullet-resistant pads, fire resistance and water resistance are the main criteria.

As such, an invention has been disclosed in terms of a preferred embodiment thereof which fulfills each and every one of the objects of the invention as set forth hereinabove and provides a new and improved bullet-resistant vest for use on a dog.

Of course, various changes, modifications, and alterations in the teachings of the present invention may be contemplated by those skilled in the art without departing from the intended spirit and scope thereof. As such, it is intended that the present invention only be limited by the terms of the appended claims.

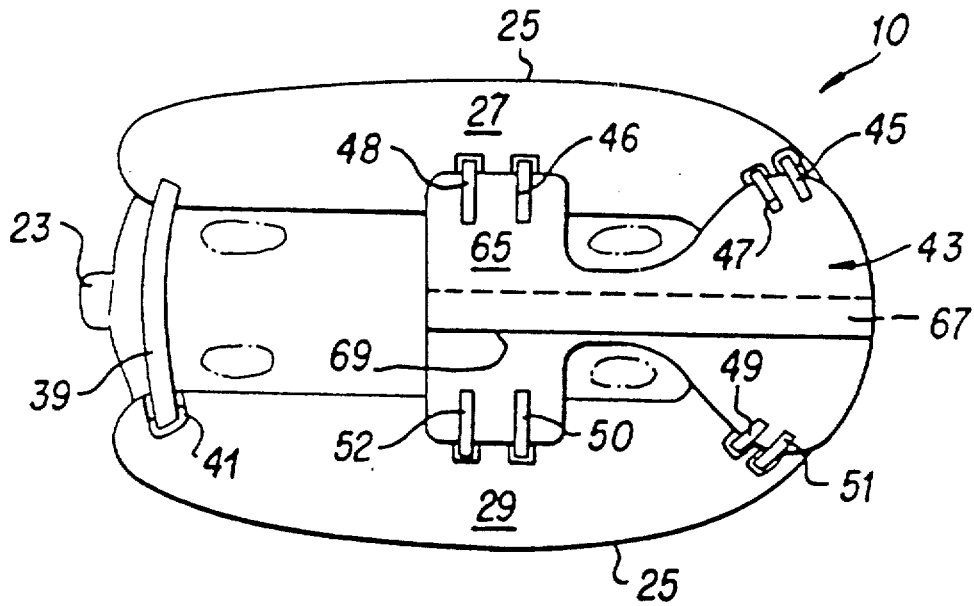

I claim:

1. An improved canine vest comprising:
   (a) an elongated body portion sized to cover the torso of a dog, said body portion being longitudinally split at a location thereon adapted to be placed at the underside of said dog and said vest further including a chest covering portion;
   (b) said split defining first and second elongated sides of said vest covering sides of said dog and fastening means for fastening said sides in close adjacency;
   (c) a plurality of pockets formed on inner surfaces of said body portion including at least a first pocket overlying an area of said vest covering a side of said dog and a second pocket in said chest covering portion;
   (d) a bullet-resistant pad removably placed in each of said first and second pockets, said pads being sized and configured to protect at least the chest and one side of said dog and vital areas and organs of said dog thereunder.

2. The invention of claim 1, wherein said chest covering portion is removably attached to said elongated body portion, said chest covering portion having said second pocket in an inner surface thereof.

3. The invention of claim 1, wherein said fastening means comprises at least one strap, and hook and pile fastening means on said strap and on said body portion.

4. The invention of claim 3, including a plurality of said straps and respective hook and pile fastening means.

* * * * *

UNITED STATES PATENT AND TRADEMARK OFFICE
CERTIFICATE OF CORRECTION

PATENT NO. : 5,068,921

DATED : Dec. 3, 1991

INVENTOR(S) : Tennyson

It is certified that error appears in the above-identified patent and that said Letters Patent is hereby corrected as shown below:

The title page should be deleted to appear as per attached title page.

Signed and Sealed this

Fourteenth Day of July, 1992

Attest:

DOUGLAS B. COMER

*Attesting Officer*   *Acting Commissioner of Patents and Trademarks*

United States Patent [19]

Tennyson

[11] Patent Number: 5,068,921
[45] Date of Patent: Dec. 3, 1991

[54] CANINE BULLET-PROOF VEST

[76] Inventor: Frank W. Tennyson, 1732 Biscayne Ave., South Daytona, Fla. 32019

[21] Appl. No.: 349,490

[22] Filed: May 9, 1989

[51] Int. Cl.⁵ .................................................. F41H 1/02
[52] U.S. Cl. ...................................... 2/2.5; 54/79
[58] Field of Search .................. 2/2.5, 2, 44, 69, 92; 54/1, 24, 65, 66, 71, 79; 119/143; 128/157, 159

[56] References Cited

U.S. PATENT DOCUMENTS

| | | | |
|---|---|---|---|
| D. 228,926 | 10/1973 | Bennett | 54/79 |
| 1,437,255 | 11/1922 | Mallinson | 54/79 |
| 1,595,834 | 8/1926 | Griffiths | 54/79 |
| 1,772,827 | 8/1930 | Udell | 54/79 |
| 2,003,435 | 6/1935 | Groff | 54/79 |
| 2,103,109 | 12/1937 | DeMar | 54/79 |
| 2,273,706 | 2/1942 | Hafner | 54/79 |
| 2,400,781 | 5/1946 | Priour | 54/79 |
| 2,417,803 | 3/1947 | DeMar | 54/79 |
| 3,141,443 | 7/1964 | Huey | 54/79 |
| 3,150,641 | 9/1964 | Kesh | 54/79 |
| 3,813,281 | 5/1974 | Burgess | 2/2.5 |
| 3,855,632 | 12/1974 | Davis | 2/2.5 |
| 4,114,352 | 9/1978 | Horton | 119/143 |
| 4,186,648 | 2/1980 | Clausen | 2/2.5 |
| 4,198,707 | 4/1980 | Haupt | 2/2.5 |
| 4,316,286 | 2/1982 | Klein | 2/2.5 |
| 4,355,600 | 10/1982 | Zielinski | 128/159 |
| 4,485,491 | 12/1984 | Rasmussen | 2/2.5 |
| 4,507,802 | 4/1985 | Small | 2/2.5 |
| 4,535,478 | 8/1985 | Zufle | 2/2.5 |
| 4,578,821 | 4/1986 | Zufle | 2/2.5 |
| 4,601,067 | 7/1986 | Buonassissi | 2/2.5 |

FOREIGN PATENT DOCUMENTS

| | | | |
|---|---|---|---|
| 1029346 | 5/1966 | United Kingdom | 119/143 |
| 1579800 | 11/1980 | United Kingdom | 54/79 |

Primary Examiner—Werner H. Schroeder
Assistant Examiner—Diana L. Biefeld
Attorney, Agent, or Firm—H. Jay Spiegel

[57] ABSTRACT

The present invention relates to a bullet-proof vest designed for use on a dog. The vest includes an outer covering which wraps around the body of the dog to protect the vital organs thereof and includes internal pockets designed to removably receive bullet-proof material.

4 Claims, 2 Drawing Sheets